United States Patent
Sriprakash et al.

(10) Patent No.: US 7,770,114 B2
(45) Date of Patent: Aug. 3, 2010

(54) SYSTEM AND METHOD FOR USING VIRTUAL ENVIRONMENTS

(75) Inventors: Bhargav Sriprakash, Ann Arbor, MI (US); Scott C. Doerrfeld, Ann Arbor, MI (US)

(73) Assignee: CADcorporation.com Inc., Ann Arbor, MI (US)

( * ) Notice: Subject to any disclaimer, the term of this patent is extended or adjusted under 35 U.S.C. 154(b) by 1188 days.

(21) Appl. No.: 11/368,038

(22) Filed: Mar. 3, 2006

(65) Prior Publication Data
US 2007/0220435 A1    Sep. 20, 2007

(51) Int. Cl.
*G06F 3/00*    (2006.01)

(52) U.S. Cl. .................. 715/706; 715/707; 715/708; 715/850

(58) Field of Classification Search .............. 715/706, 715/707, 708
See application file for complete search history.

(56) References Cited

U.S. PATENT DOCUMENTS

| | | | |
|---|---|---|---|
| 5,416,694 A * | 5/1995 | Parrish et al. ............. 705/8 |
| 6,036,601 A | 3/2000 | Heckel | |
| 6,226,669 B1 * | 5/2001 | Huang et al. ............. 709/204 |
| 6,345,278 B1 * | 2/2002 | Hitchcock et al. ............ 707/100 |
| 6,529,210 B1 * | 3/2003 | Rees ............................ 345/654 |
| 6,881,148 B2 * | 4/2005 | Yotsugi et al. ................ 463/42 |
| 6,920,495 B1 * | 7/2005 | Fuselier et al. .............. 709/224 |
| 6,954,728 B1 * | 10/2005 | Kusumoto et al. ............. 705/1 |
| 2002/0116297 A1 * | 8/2002 | Olefson ........................ 705/27 |
| 2002/0154174 A1 | 10/2002 | Redlich et al. | |
| 2003/0107569 A1 * | 6/2003 | Endo et al. .................. 345/419 |
| 2004/0143469 A1 * | 7/2004 | Lutz et al. ....................... 705/7 |
| 2005/0137896 A1 * | 6/2005 | Pentecost et al. ............... 705/1 |
| 2007/0269786 A1 * | 11/2007 | Jeon ............................ 434/323 |
| 2008/0120251 A1 * | 5/2008 | Tyagi et al. ............... 705/36 R |

FOREIGN PATENT DOCUMENTS

WO    WO-01/24083 A2    4/2001
WO    WO-01/88803 A2    11/2001

* cited by examiner

*Primary Examiner*—Ryan F Pitaro
(74) *Attorney, Agent, or Firm*—Honigman Miller Schwartz and Cohn LLP

(57) ABSTRACT

A system for establishing a virtual environment is disclosed. According to an embodiment, the system includes at least one computer terminal for use by a participant for interfacing to the virtual environment and an operation module coupled to the computer terminal for manipulating the virtual environment in response to one or more actions by the participant. The operation module may be adapted to assess the mental dexterity of the participant in the virtual environment. The operation module may also be adapted as a marketing tool for soliciting donations.

31 Claims, 10 Drawing Sheets

SYSTEM AND METHOD FOR USING VIRTUAL ENVIRONMENTS

TECHNICAL FIELD

The present disclosure relates to a system and method of utilizing interactive graphics. According to an embodiment, the use of interactive graphics may be directed to a virtual environment (i.e. three-dimensional, 360-degree virtual reality imaging). According to an embodiment, the interactive graphics may be utilized for recruiting one or more persons for membership, employment, admission, or the like into an organization, such as, for example, an institute of education, a corporation, a professional society, a club, or the like. According to an embodiment, the interactive graphics may be utilized for soliciting and securing gifts from potential donors to a non-profit organization, educational institution, and other donor worthy organizations.

BACKGROUND

Recruiting persons (i.e., "candidates") for membership, employment, or admission is a critical aspect to the success, image, and/or public perception of an organization or institution. The person, entity, or agent who seeks candidates directly, or, on the behalf of the organization, is typically referred to as a "recruiter." Typically, information available to the candidate about the organization is conveyed by way of printed materials, video, film, or electronically, for example, by way of the Internet. On the other hand, information available to the organization/recruiter about the candidate is limited and typically conveyed by way of a resume, grade transcripts, one or more personal references provided by the candidate, background checks, and the like.

The Internet increases the reach and efficiency of an information seeker while decreasing the disseminating costs of the information provider. With respect to recruiting techniques, it is clear that both the organization/recruiter and candidate may mutually benefit by taking advantage of the Internet's capabilities of disseminating and receiving information, respectively.

Regarding, for example, the recruiting of student-candidates by educational institutions (e.g. universities), a fundamental aspect of the recruiting process is to provide the student-candidate with a sense of student life, campus atmosphere, and/or available social and/or internship/career experience offerings from surrounding communities. Prior to the existence of the Internet, a student-candidate could only obtain an understanding of the campus and surrounding communities through anecdotes of current- or former-students, pictures, articles, or personal visits, which may be inconvenient and costly especially if the student-candidate does not reside relatively close to the university.

By using the Internet, one may acquire a sense of a cityscape through three-dimensional, 360-degree panoramic photographs available from, for example, IPIX® of San Ramon, Calif. As more powerful computers are allowing greater dynamic informational content to be viewed by an end-user, the increasing capability of graphic processors have enabled a generation of hardware that can create photo-realistic computer-generated environments that may be provided over the Internet at the consumer level. Accordingly, one may take a virtual tour of a cityscape at his/her own convenience from any location, such as, for example, one's residence, a computer terminal kiosk, or the like.

Accordingly, although a three-dimensional, 360-degree visualization of an environment may be made available to, for example, a student candidate by way of the Internet using conventional means, such three-dimensional, 360-degree visualizations of an environment, such as, for example, a virtual university campus, are typically focused on the presentation of exterior spaces (i.e. a facade view, side-wall view, rear-wall view, or bird's-eye, overhead view of a house, building, courtyard, or the like). Additionally, known 360-degree visualizations, such as, for example, in an aircraft flight simulator, are made available to assess a person's physical dexterity; however, such physical dexterity assessments of a person interacting with a virtual environment do not necessary provide feedback regarding a person's mental dexterity (e.g. I.Q., social skills, "the drive to succeed," and the like).

Additionally, it is also known that alumni are often solicited by their alma mater for financial gifts, and in return, the university often offers recognition for the gifts such as by naming a campus building in recognition of the donor. The university's solicitation methodology for securing a financial gift can often be a critical aspect of the of the university-donor relationship. Typically, if, for example, a building is to be constructed in the donor's name, the donor would like to "see ahead of time what they are paying for." Accordingly, an in person, on-site meeting is typically conducted with the potential donor being present with one or more educational institution representatives along with architectural planners, landscape architects, sculptors, or the like to provide the potential donor with a sense of what a building, landscaping, signage, statue, or the will look like by viewing hand-drawn or computer-generated hardcopies of a building, landscaping, signage, statue, or the like. Such in-person meetings require careful planning, time, and money.

As such, there is a need to provide a candidate, such as, for example, a student candidate, with the ability to navigate through a three-dimensional, 360-degree visualization of, for example, a virtual environment, such as, for example, a university campus, while remotely interacting with, for example, interior spaces of a building, other potential participants in the virtual environment, and/or other interactive features provided in the virtual environment, such as, for example intellectual puzzles/problems that may assist a recruiter in assessing a candidate's mental dexterity relating to their qualifications for various positions (i.e. acceptance into an academic institution, employment or the like). Additionally, there is a need to provide more information about a candidate to a recruiter other than by conventional means and methodologies associated with resumes, personal references, background checks, and the like. Additionally, there is a need to provide an efficient methodology for soliciting and securing financial gifts from potential donors to an educational institution or other donor worthy organizations.

BRIEF DESCRIPTION OF THE DRAWINGS

The present disclosure will now be described, by way of example, with reference to the accompanying drawings, in which.

DESCRIPTION OF THE PREFERRED EMBODIMENT

Figure 1:
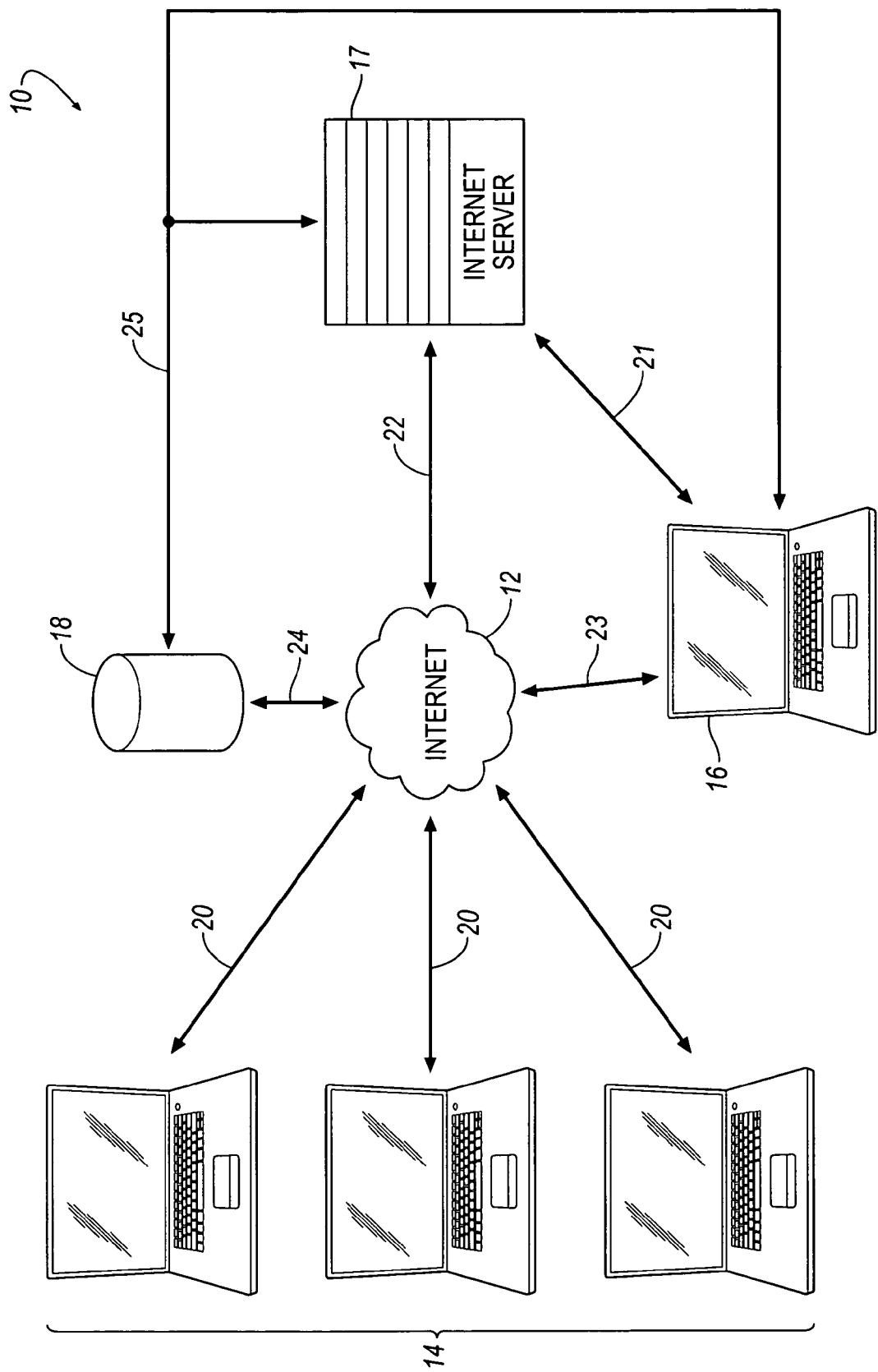
FIG. 1 is a representative view of a system and method for using virtual environments according to an embodiment.

A system and method for using virtual environments is shown generally at 10 in FIG. 1 according to an embodiment. As illustrated, the Internet is generally represented at 12 in the form of a cloud, one or more candidates is/are shown generally at 14, and a recruiter is shown generally at 16. An internet server is generally shown at 17. Each candidate 14 and recruiter 16 is generally shown in the form of a computer workstation having a communication path 20, 23, respectively, with the Internet 12. According to an embodiment, the system and method 10 is particularly useful in facilitating a cohesive transmittal of information between the recruiter's organization and the potential candidates 14 by way of the Internet 12. According to an embodiment, the recruiter 16 may engage and evaluate the candidates 14 based on their interests, analytical capability, virtual social interactions (with other potential candidates 14 and/or the organization/recruiter 16), or any other test that can be envisioned (i.e. to assess the candidate's mental dexterity). According to an embodiment, the candidate's mental dexterity may be scored in the form of a quotient (i.e. the candidate 14 amasses points that are divided by a total number of potential points to create "a mental dexterity quotient"). Additionally, the candidate 14 may receive information about the organization associated with the recruiter 16 for the purpose of accepting/denying a potential invitation from the organization relating to an admission to the organization, a job offer, or the like.

The "institutional end" of this system 10 does not require the presence of a live person (represented by a recruiter 16). Although recruiter 16 can be a live person, it is also contemplated that "recruiter functions" discussed herein could be implemented algorithmically in software to create a virtual recruiter 16, or the like. Therefore, according to an embodiment, the institutional end of the system 10 may include a live person/recruiter 16 that operates a terminal, or, a virtual recruiter 16 implemented in software. According to an embodiment, automated software may be located, for example, at a server 17 to perform the function of operating a virtual recruiter 16, or, the virtual recruiter 16 may be implemented in a computer other than server 17, such as, for example, a computer workstation 16. Communication to/from a recruiter 16 and server 17 may be enabled over a communication path 21. Communication between the Internet 12 and server 17 may be enabled over a communication path 22. Communication between the server 17 and an operation module 18 may be enabled over a communication path 25.

In the case that the recruiter 16 is a live person operating the recruiter computer terminal, the recruiter 16 may include, for example, headhunters, human resource managers, admission officers, faculty, staff, leaders, managers, or the like. The candidates 14 may include, for example, potential students for a primary school, secondary school, university, or the like. Alternatively, the candidates 14 may include a(n) un/skilled worker seeking employment from a company, business, corporation, or the like. Alternatively, the candidates 14 may include one or more persons interested in joining a social group/club including, for example, a professional society, country club, or the like. As such, in the case that the recruiter 16 is a live person, the recruiter 16 may be part of/directly employed by, or, an agent of, for example, the primary school, secondary school, university, company, business, corporation, professional society, country club, or the like.

According to an embodiment, the system and method 10 may permit a recruiter 16 of an academic institution to ascertain a student candidate's mental dexterity (e.g. intelligence, I.Q., social maturity, and/or interest/appeal level). As such, the system and method 10 may increase the overall efficiency of the admissions process by facilitating a better understanding of the likelihood that a qualified student candidate 14 will accept an admission invitation. If desired, the academic institution may encourage/require that student candidates 14 participates in the system and method 10 as part of an admissions application process to supplement academic records, personal essays, and standardized test scores including, but not limited to Scholastic Aptitude Test (SAT) scores, American College Test (ACT) scores, Graduate Management Admission Test (GMAT) scores, Law School Admission Test (LSAT) scores, or the like. The system and method 10 may enable a recruiter 16 to quickly and efficiently sort the eager, academically well-qualified student candidates 14 from less eager and/or less qualified student candidates 14.

Regarding traditional student admission application procedures, it is known that a student candidate 14 may be inclined to accept an admission invitation from his/her $1^{st}$ choice institution while also applying to $2^{nd}$, $3^{rd}$, or $4^{th}$ choice institutions. The application to the $2^{nd}$, $3^{rd}$, or $4^{th}$ choice institutions may be executed by the student candidate 14 for his/her own self-assessment, or, alternatively, as insurance in the event that the $1^{st}$ choice institution does not extend an admission invitation to the candidate 14. Accordingly, the conventional admission application to $2^{nd}$, $3^{rd}$, or $4^{th}$ choice institutions may be made solely based upon name/reputation and/or reviews of the $2^{nd}$, $3^{rd}$, or $4^{th}$ choice institutions without the candidate 14 ever seriously considering a potential admission invitation from $2^{nd}$, $3^{rd}$, or $4^{th}$ choice institutions, should one be extended. As such, the system and method 10 may also serve as an admission application deterrent for less eager/serious student candidates 14 who are less likely to apply to a $2^{nd}$, $3^{rd}$, or $4^{th}$ choice institution that utilizes/requires the use of the system and method 10 if the student candidate's interest in attending the $2^{nd}$, $3^{rd}$, or $4^{th}$ choice institution is not relatively serious. A student candidate 14 that is interested in a particular academic institution and also participates in the system and method 10 would have an advantage over less eager/serious/qualified student candidates 14 who practice the conventional admission application method/process by providing the academic institution with only an application fee, academic resume, essay, SAT score, ACT score, GMAT score, LSAT score, or the like.

Figure 2:
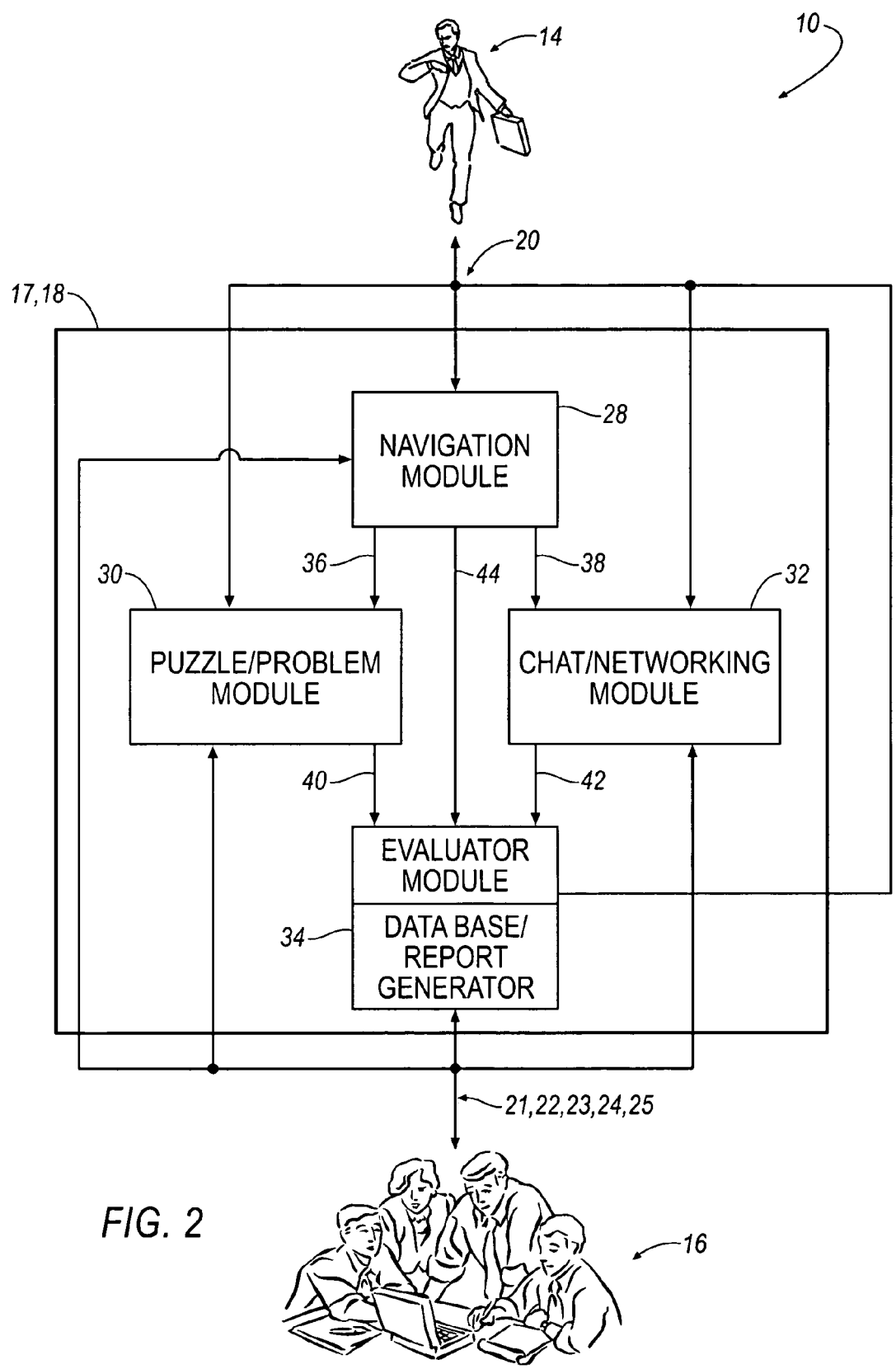
FIG. 2 is a block diagram of the system and method for using virtual environments according to an embodiment.

Referring to FIGS. 1 and 2, an operation module of the system and method 10 is shown generally at 18. The operation module 18 is hosted by, or, hosted on behalf of the recruiter 16. Although the operation module 18 is shown remotely with respect to the location of the recruiter 16 in FIG. 1, it will be appreciated that the operation module 18 may be located proximate, integral, and/or networked with the recruiter's computer workstation 16. Accordingly, if the operation module 18 is remotely located, as illustrated in FIG. 1, the operation module 18 may communicate with the Internet 12 over a communication path 24 and/or with the recruiter 16 over a communication path 25; otherwise, the operation module 18 may communicate over the Internet 12 over the communication path 23. It will be appreciated that that operation module 18 may be remotely located, or, located proximate the Internet server 17. If located remotely away from the Internet server 17 as shown in FIG. 1, the operation module 18 may communicate with the Internet server 17 over communication paths 22, 25. In addition to one or more computer workstations in FIG. 1, the candidate 14 and/or recruiter 16 may also utilize sensory stimulating technologies including, but not limited to, a virtual reality head-mounted display, force feedback actuators, sound devices, olfactory stimulating devices, or the like.

Additionally, the system and method 10 may include one or more telephones, IP telephones, microphones, or the like so that the candidate 14 and/or recruiter 16 may communicate verbally over the Internet 12 using well-known voice over IP (VoIP) technologies. Accordingly, such equipment may used as a primary component to enable communications between one or more candidates 14, recruiters 16, or the like. Alternatively such equipment may be used to supplement the keyboard to enable voice and text communications between one or more candidates 14, recruiters 16, or the like.

In an application, according to an embodiment, the operation module 18 integrates system-level technologies to produce a compelling mechanism that remotely interfaces with, informs, guides, entertains, and/or evaluates a candidate 14 over the Internet 12. Referring to FIG. 2, the system-level technologies may include, but are not limited to, a navigation module 28, a puzzle/problem module 30, a chat/networking module 32, and an evaluator module 34. As illustrated, the candidate 14 has bi-directional communication with each of the navigation, puzzle/problem, and chat/networking modules 28, 30, 32 over the communication channel 20. The recruiter 16, may similarly have bi-directional communication with each of the navigation and chat/networking modules 28, 32. If desired, the recruiter 16 may permit feedback to the candidate 14 from the evaluator module 34 over the communication channel 20.

The navigation module 28 may include a real-time graphics engine, a virtual reality engine, an immersive graphics medium, a physics engine, or the like. 'Navigation,' through the interactive graphical environment, can be adapted to encompass the range of traditional input devices (i.e., a keyboard/mouse/joystick), as well as imminent implementations of gyroscopic motion-tracking devices, or, alternatively, advanced eyeball tracking devices or the like.

The puzzle/problem module 30 may include application specific software authored for/by the organization/recruiter 16 that includes questions pertaining to, or, about the organization. It will be appreciated that the puzzles/problems may be customized based on case studies, logic problems, memory tests, trivia questions, strategy games, or the like. 'Puzzle/Problem Solving' is designed to captivate and evaluate the candidate 14. The puzzles/problems are designed to pose an intellectual challenge while providing sensory clues to the candidate 14.

The chat/networking module 32 may include an online networked utility. 'Networking' will allow communication among various candidates 14 within the interactive graphical environment. The chat/networking module 32 may be implemented as a client/server system to engage many candidates 14 simultaneously. The client/server system permits communication between the local client hardware and the centralized server that receives a report at the end of the candidate's virtual environment experience.

The evaluator module 34 may include a database and report generation utility that can be standardized to feed Customer Relationship Management tools and the like. An embedded evaluator is included in the evaluator module 34 and may selectively choose to provide feedback to the candidate 14, based upon the recruiter's pre- or post-defined criteria. The evaluation performed by the evaluator module 34 forms the core of the recruiting function and serves to test, monitor, and evaluate the candidate 14 during his/her interaction with the program. The evaluation may be a summary of the candidate's experience and can be provided in a customizable format. The format can be designed to feed any Customer Relationship Management Tools or Data Mining Utilities to assist in deciphering or correlating information. The evaluation may contain a score and any other additional data that can be used by, for example, admissions staff in an academic institution as a qualifying criterion. Feedback may be provided during and/or after the virtual environment experience to help guide candidates 14 and/or recruiters 16 through admissions process.

During the course of the navigation of the virtual environment, the navigation module 28 may invoke the puzzle/problem module 30 and/or chat/networking module 32 as indicated at communication lines 36, 38. To invoke the puzzle/problem module 30, for example, the candidate 14 may navigate to a visible/invisible target in the virtual environment, and, upon arriving at the target, a puzzle/problem may appear or be opened for the candidate 14 to solve, and, the candidate's answer may be scrutinized. To invoke the chat/networking module 32, for example, the candidate 14 may navigate to a virtual candidate 14 and/or recruiter 16, which may appear as a virtual person, and, upon arriving at the location of the virtual person, a chat window may appear for selection. Alternatively, the candidate 14 may click on a graphical "chat button" appearing in the computer terminal monitor to request/initiate a chat with other candidates 14 and/or a recruiter 16 that are available and currently navigating the virtual environment. Puzzle/problem scores, chat/networking logs, and/or navigation logs may be provided to the evaluator module 34 over communication lines 40, 42, 44, respectively. The tallied scores and log reports of the candidate 14 can be saved locally in, or, remotely from the operation module 18 for later analysis by the recruiter 16.

As indicated, the navigation module 28 is employed to permit the candidate 14 to explore interactive graphics provided by the organization/recruiter 16 that may be in the form of a three-dimensional, 360-degree virtual environment (i.e. virtual reality imaging). According to an embodiment, the virtual environment may replicate existing facilities on a university campus including dormitories, classroom buildings, student activity buildings, libraries, social halls, bookstores, stadiums, gymnasiums, offices relating to admissions/registrars/professors/academic advisor, deans, or the like. The generation of the interactive graphics to the candidate 14 can be achieved through the real-time graphics engine, virtual reality engine, or any desirable immersive graphical mechanism. As such, a networked exploration of a virtual space is provided where multiple candidates 14 can interact by means of a seamlessly integrated interface provided by the operation module 18. According to an embodiment, one or more candidates 14 may elect to have a virtual tour guide, virtual admissions representative, or virtual faculty member lead/participate in a virtual exploration in addition to answering any questions that the candidate 14 may have.

In addition to the exploratory interactions that a candidate 14 may take advantage of by using the system and method 10, the recruiter 16 may harvest additional information about the candidate 14 for later evaluation during admission selection process. As the candidate 14 navigates the virtual environment, the puzzle/problem module 30 and chat/networking module 32 may be invoked, as describe above, or, at any desirable time by default programming, or, by the recruiter 16.

For example, if a candidate 14 is interested in attending the university's law school, the candidate 14 may navigate the virtual campus to the location of the law school, and, upon entering the grounds of the virtual law school, the puzzle/problem module 30 may be invoked and the candidate 14 may be presented with facts or statistics about the law school that may be un/familiar to the candidate 14. As such, the candidate 14 may be prompted with the following information: "Welcome to University Law School. The first dean of the law school was Joseph John Doe in the year 1858." As the candidate 14 continues to navigate the virtual law school campus, the candidate 14 may be engaged with additional facts relating to the law school, such as, for example, current staff and what their specialties are, and, at a time later, be asked questions relating to facts that may or may not have been presented, such as: "Who was the first dean of the law school?," "In what year was the first dean installed?," or "Who currently instructs a course on Antitrust Law?" If questions are answered in/correctly, the candidate 14 may increase/decrease a score or number of points that may have an overall bearing on a final score/number of points accumulated during the virtual environment experience.

As the puzzle/problem module 30 manages and delivers information to the candidate 14, the chat/networking module 32 may retain a log of conversations that the candidate 14 holds with other candidates, agents of the recruiters, or the recruiters 16 themselves to determine a sense of the candidate's responses, approach, and strategy in articulating their thoughts. Upon exhausting the puzzles/problems and exiting the virtual environment, the embedded logic of the evaluator module 34 assesses the candidate's intellect by providing a score, which may be weighed by the speed and accuracy that puzzles/problems were solved. Additionally, the log of chats held by the candidate 14 may be stored for later review by the recruiter 16. If desired, the log of chats may be scored in view of the candidate's use of proper grammar and/or spelling. The candidate 14 may then be assigned a "virtual environment rating," which may be available in a standardized score/rating format as a supplement to an academic institution's admissions criteria by the evaluator module 34 based on his/her interaction with the customized puzzles/problems and/or chat log.

Additional information about the candidate 14 may be obtained by using the embedded evaluator to monitor the candidate's navigational responses instigated by visual triggers incorporated into the graphical user interface. For example, the embedded evaluator may observe the amount of time that users spends looking at certain types of virtual bulletin boards as an indication of the candidate's interests, their inclination towards an art, or the candidate's proclivity towards aspects of the campus facilities. Further information may be ascertained from the interactions that take place among multiple candidates over an online network. Additionally, the embedded evaluator may look for key words used during networked interactions by the candidate 14 to gain a sense of his/her personality traits, tastes, characteristics, word skills, and the like. The embedded evaluator may, in response to a key/flagged-word evaluation, prompt the candidate 14 by offering navigation suggestions, in the form of, for example, pop-up windows or pop-up navigational arrows, that are triggered by the detection of the key/flagged words from a chat log.

For example, if the student chats with other candidates 14 about fraternities/sororities and spends time looking at a virtual flyer placed on a bulletin board in an academic building for an upcoming event at a fraternity/sorority house, navigation arrows may be provided to direct the candidate 14 to the location of the fraternity/sorority house. If desired, information about the candidate's interests in the fraternity/sorority event may trigger the evaluator module 34 to provide the fraternity/sorority with a notice that the candidate 14 is possibly interested in becoming new member. Upon gaining this insight, the fraternity/sorority may contact the candidate 14 during rush week regarding rush week events should the candidate 14 be invited to and join the university. Additionally, the candidate's profile may be flagged to provide additional information about the fraternity/sorority by way of any desirable means, such as email, conventional hand delivery mail, or the like.

Figure 3:
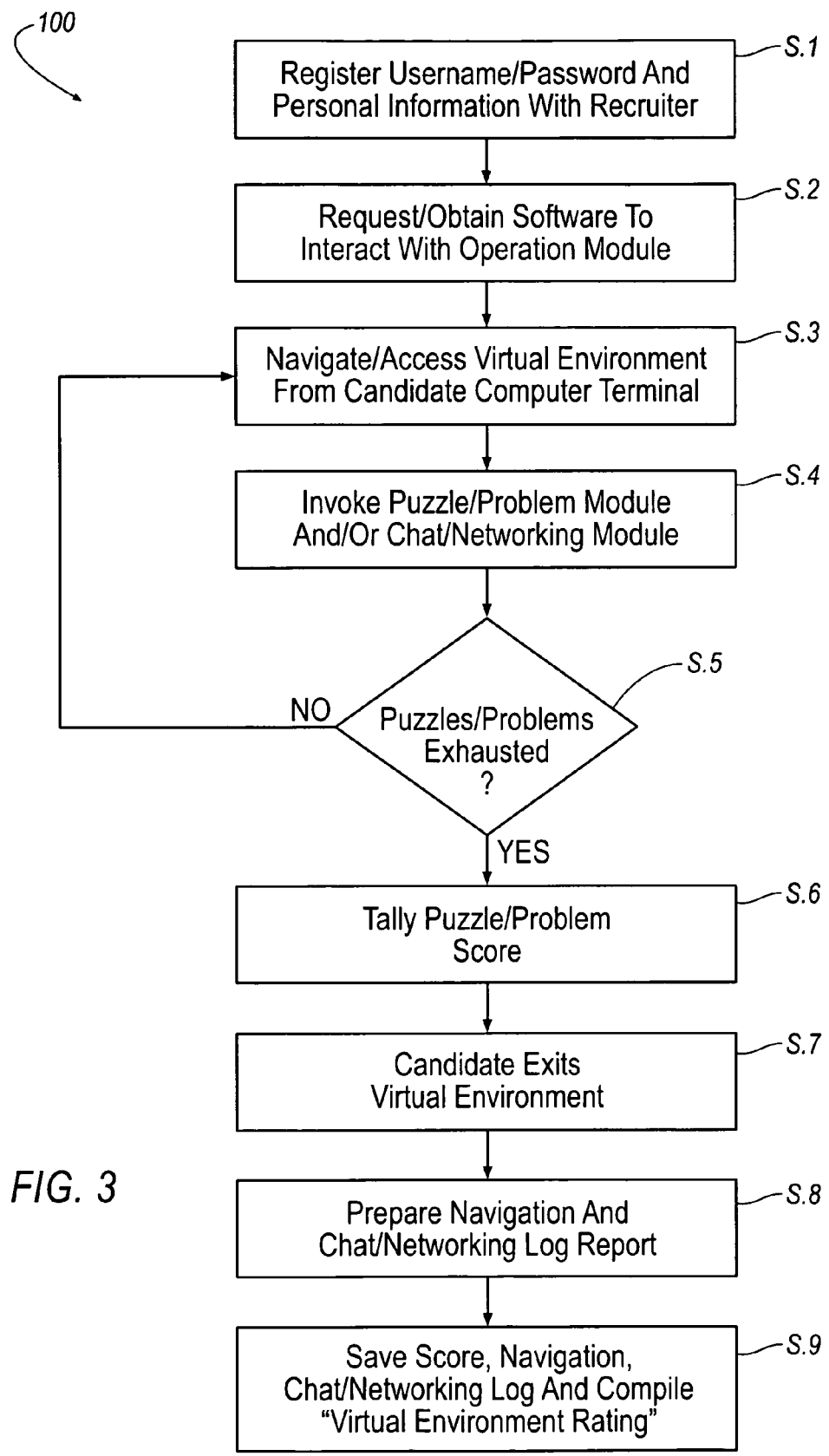
FIG. 3 is a flow chart for operating the system and method from the candidate computer terminal side according to an embodiment.

Referring now to FIG. 3, a flow chart 100 for operating the system and method 10 from the candidate computer terminal side is shown according to an embodiment. First, at step S.1, the candidate 14 registers a username/password and personal information with a recruiter 16 and/or internet server 17 on the institutional end of the system 10. The personal information may include the name, address, telephone, email address, social security number, resume, academic records, personal essays, a SAT score, an ACT score, a GMAT score, a LSAT score, or the like. The registration may take place, for example, by way of an electronic communication over the Internet 12, or, by way of, a paper-based system via traditional mail service. Then, at step S.2, software that enables interaction with the operation module 18 is requested/obtained by way of, for example, an electronic download over the Internet 12. Alternatively, the software may be acquired on a CD-ROM from the organization/recruiter 16 and installed on the candidate's computer terminal.

At step S.3, the candidate 14 executes the software for interacting with the operation module 18 and navigates the virtual environment as described above. At step S.4, during the navigation of the virtual environment, the puzzle/problem module 30 and/or the chat/networking module 32 may be invoked as described above. Then, at step S.5, the operation module 18 will detect if and when the puzzles/problems made available to the candidate 14 have been exhausted. Upon exhausting the puzzles/problems, the operational module 18 will tally a score of the un/solved puzzles/problems at step S.6.

At step S.7, the candidate 14 may, at any time, manually exit the virtual environment; alternatively, upon exhausting the puzzles/problems, the operation module 18 may automatically cause the candidate 14 to exit the virtual environment, signaling the end of the program. According to another embodiment, the candidate 14 may automatically exit the virtual environment if access time to the virtual environment is set and limited, for example, by the organization/recruiter 16 such that the candidate 14 is offered a limited amount of time to locate and solve puzzles/problems in a similar fashion associated with standardized tests. At step S.8, the operation module 18 may prepare a chat/networking log report, and then, at step S.9, the score of the puzzles/problems, navigation and chat/networking log is saved and compiled by the operation module 18 as a "virtual environment rating" for later processing and/or analysis by the recruiter 16.

Figure 4:
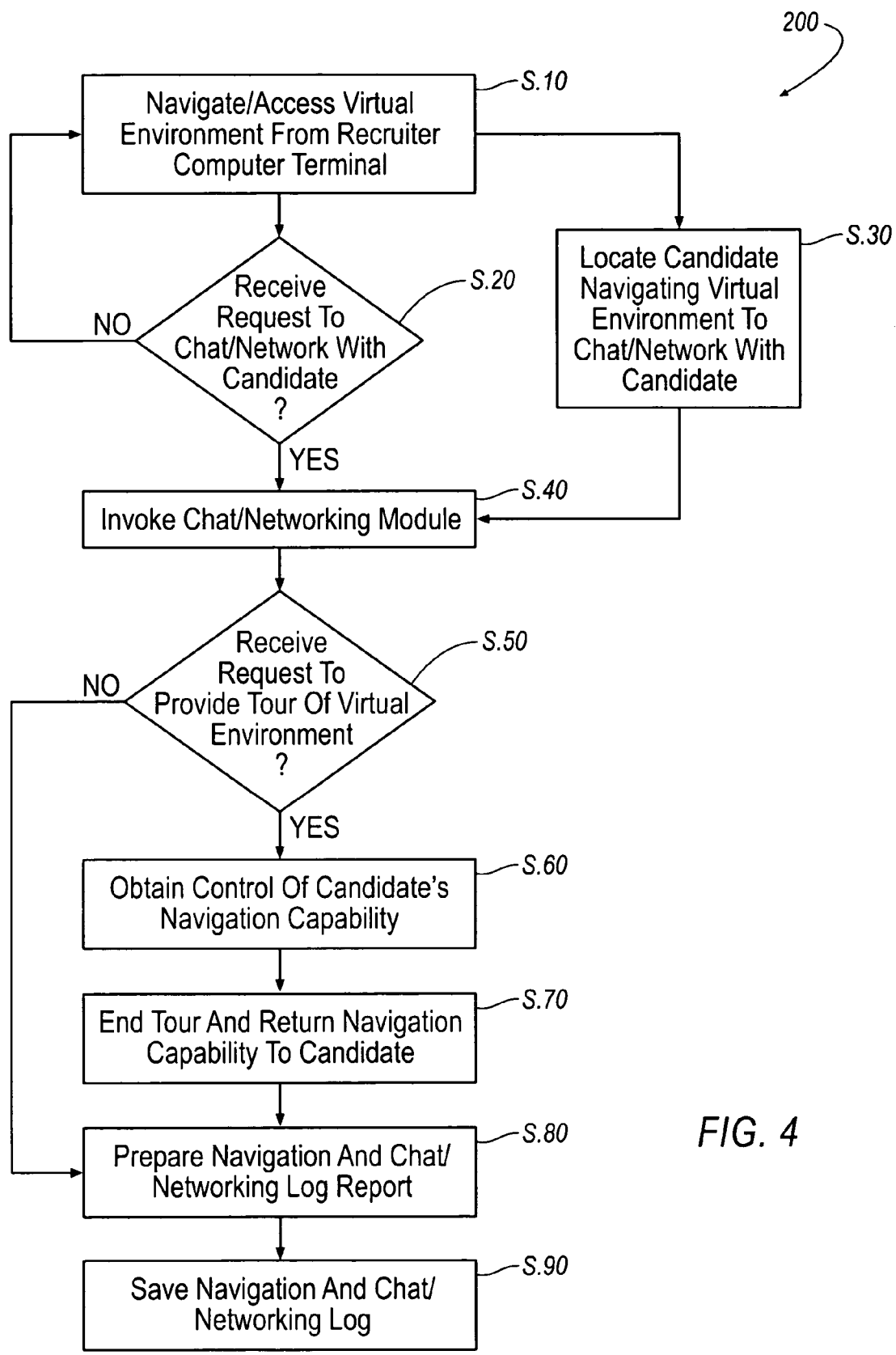
FIG. 4 is a flow chart for operating the system and method from the recruiter computer terminal side according to an embodiment.

Referring now to FIG. 4, a flow chart 200 for operating the system and method 10 from the recruiter computer terminal side is shown according to an embodiment. First, at step S.10, a live recruiter 16 (i.e. a person) or a virtual recruiter 16 (i.e., an automated program) navigates/accesses the virtual environment, with, for example, an assigned username/password. Then, at step S.20, the recruiter 16 may receive a request to chat/network with a candidate 14; alternatively, the recruiter 16 may locate a candidate 14 in the virtual environment at step S.30 for unsolicited chatting/networking. Upon engaging the candidate 14 at either step S.20 or S.30, the chat/networking module 32 is invoked at step S.40 from the recruiter computer terminal side.

At step S.50, the recruiter 16 may receive a request from the candidate 14 for a tour of the virtual environment. If a tour is requested, the recruiter 16 may obtain control of the candidate's navigation capabilities at step S.60, conversely, if no request for a tour is placed, the flow chart is advanced to step S.80. Upon completing the tour, should one be requested, the recruiter 16 may return navigation controls back to the candidate 14 at step S.70 for independent exploration of the virtual environment. Then, at step S.80, the recruiter 16 may request/initiate a navigation and chat/networking log report by the operation module 18, which may include notes prepared by the recruiter 16 of his/her impression of the candidate 14. At step S.90, the navigation and chat/networking report, which may or may not include the recruiter's notes, are saved by the operation module 18.

Figure 5:
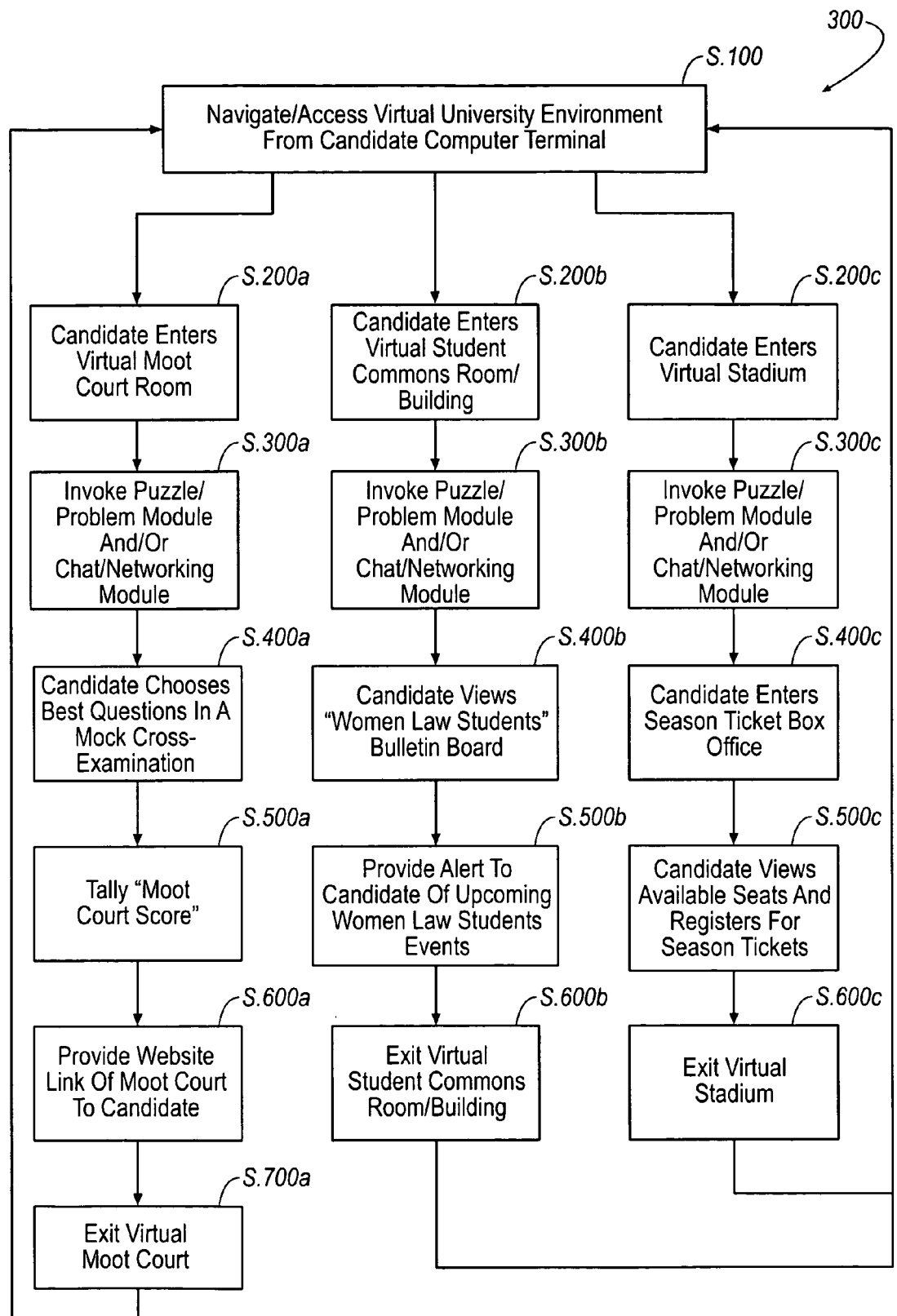
FIG. 5 is a flow chart illustrating a plurality of candidate interaction options of the system and method according to an embodiment.

Referring now to FIG. 5, a flow chart 300 illustrating a plurality of interaction options of the system and method 10 from the candidate computer terminal side is shown according to an embodiment. Although the flow chart 300 illustrates three general option branches starting, respectively, at steps S.200*a*, S.200*b* and S.200*c*, it will be appreciated that the disclosure is not limited to the three illustrated examples and that any desirable option may be programmed, as determined by the organization.

First, a student candidate 14 may access a virtual reality law school campus environment as described above in steps S.1-S.3. Then, at step S.200*a*, the student candidate 14 may navigate to, and discover, a virtual moot court room. Once inside the virtual moot court room, the puzzle/problem module 30 and/or chat networking module 32 may be invoked at step S.300*a* so that the candidate 14 may participate in a simulated mock cross-examination at step S.400*a* in which the candidate 14 may choose, for example, a "best question" from a plurality of questions that are expresses in, for example, a multiple-choice-style format. Upon completing the simulated mock cross-examination, a "moot court score" may be tallied at step S.500*a*. Then, at step S.600*a*, the operation module 18 may provide additional information regarding the moot court program at the law school, such as, for example, a website link. At step S.700*a*, the candidate 14 exits the virtual moot court and returns to the virtual reality law school campus.

At step S.200*b*, the candidate 14 may navigate to, and discover a virtual student common room/building. Once inside the virtual student common room/building, the puzzle/problem module 30 and/or chat networking module 32 may be invoked at step S.300*b*. At step S.400*b*, the candidate 14 may navigate to and discover a "Woman Law Student" bulletin board. After viewing the "Woman Law Student" bulletin board for a predetermined period of time, the operation module 18 may provide an alert, for example, in the form of a pop-up window, emails, or the like regarding upcoming Woman Law Students events at step S.500*b*. At step S.600*b*, the candidate 14 exits the virtual student common room/building and returns to the virtual reality law school campus.

At step S.200*c*, the candidate 14 may navigate to, and discover a virtual stadium. Once on the grounds of the virtual stadium, the puzzle/problem module 30 and/or chat networking module 32 may be invoked at step S.300*c*. Then, at step S.400*c*, the candidate 14 may enter the stadium's virtual season ticket box office. At step S.500*c* the candidate 14 may manually, or, as described above in steps S.50-S.70, take a guided tour of the virtual stadium with a virtual box office agent to pick out the best available seat for an upcoming football season. If desired, the candidate 14 may register for season tickets with the virtual box office agent. At step S.600*c*, the candidate 14 may return to the virtual reality law school campus.

Although the above-described examples are related to educating a student candidate 14 that is interested in learning more about a university, and assessing a student candidate 14 by an agent of the university, it will be appreciated that the system and method 10 may be applied to assess any candidate 14 for other types of organizations or institutions. As an example, a recruiter 16 of an electrical engineering firm may pose electrical circuit problems to a candidate 14 to determine the candidate's abilities prior to conducting a more detailed in-person interview. If the candidate 14 is interested in the position, and must relocate, the recruiter 16 may give the candidate 14 a virtual tour of the local and/or regional area. According to an embodiment, the operation module 18 may include or interface/interact with virtual reality real estate databases to provide the recruiter 16 and/or candidate 14 with virtual tours, availability, and pricing indexes of homes, apartments, condominiums, and the like that are available for sale or rent to assist a potential job candidate 14 that may need to relocate should a job offer be extended. According to another embodiment, the recruiter 16 may be a manager of a country club and offer a potential candidate member 14 a tour of a golf course, tennis courts, dining facilities, swimming pools, and the like. If the candidate member 14 is interested in joining, a "virtual meet and greet" of current members may be conducted prior to joining the club.

As such, it will be appreciated that system and method 10 is useful in a number of applications for the benefit of providing information about an organization to a candidate 14 while also assessing the many qualities and capabilities of the candidate 14. Candidates 14 and organizations/recruiters 16 alike may mutually benefit from the capabilities of the system and method 10 to determine if a mutually beneficial relationship between the candidate 14 and the organization is desirable.

Figure 6:
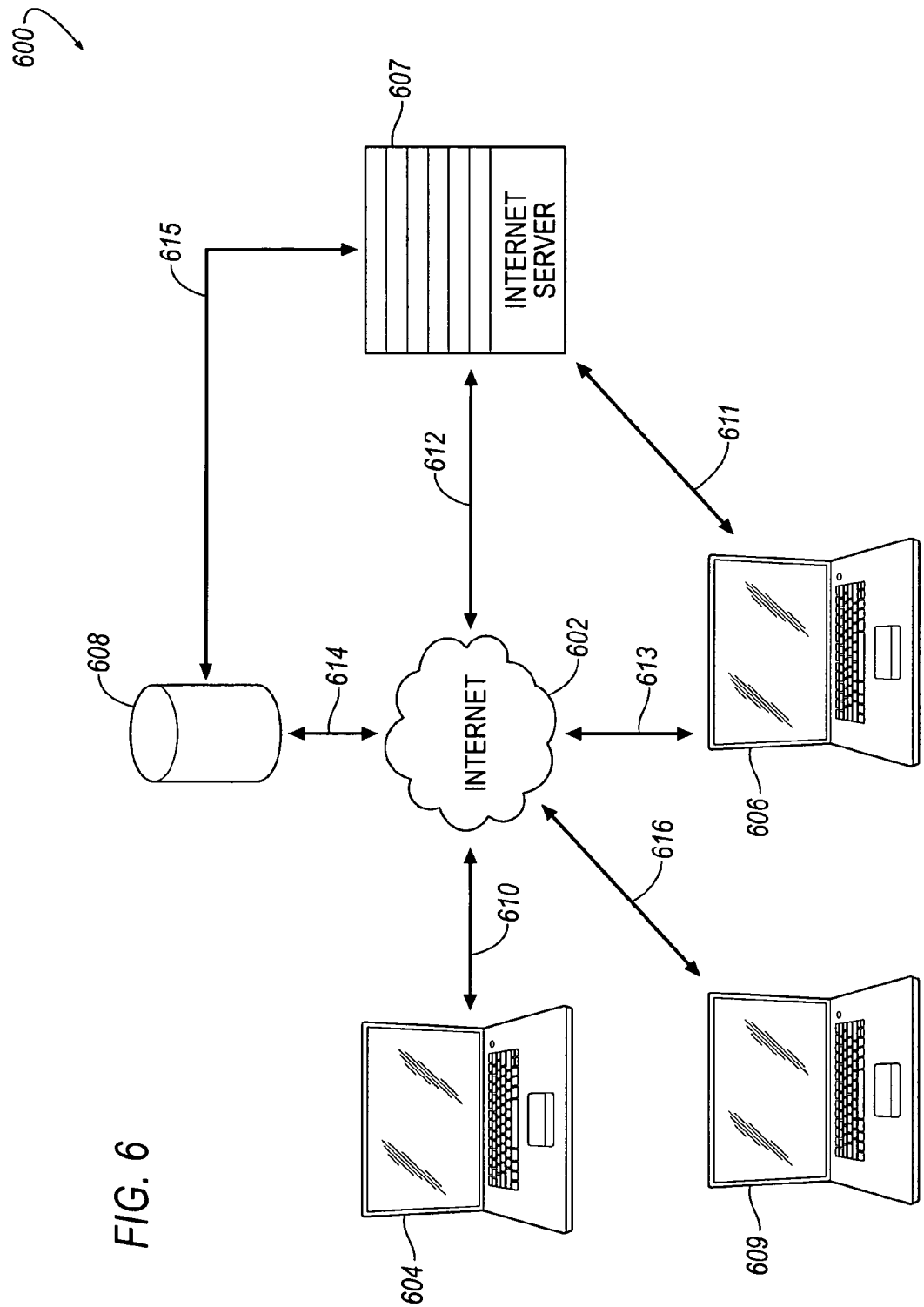
FIG. 6 is a representative view of a system and method for using virtual environments according to an embodiment.

A system and method for using virtual environments is shown generally at 600 in FIG. 6 according to an embodiment. The system and method 600 is generally related to the utilization of interactive graphics for soliciting and securing financial gifts from potential donors to an organization. According to an embodiment, the organization may be, for example, an educational institution, such as, for example, a university or any other donor worthy institution.

As illustrated, the Internet is generally represented at 602 in the form of a cloud, one or more potential donors is generally represented at 604, an educational institution representative, such as, for example, an alumni-relations officer, is shown generally at 606, and a financial institution representative is shown generally at 609. Each potential donor 604, educational institution representative 606, and financial institution representative 609 is generally shown in the form of a computer workstation having a communication path 610-616 with the Internet 602. Although the term "education institution representative" is used in relation to reference numeral 606, it will be appreciated that the representative 606 may also be referred to as a solicitor, or the like; as such, reference numeral 606 is not limited to an educational institution, an educational institution representation, agent, or the like, and may, for example, represent a donation/grant solicitor, for any organization, institution, or the like, such as, for example, a charity, religious institution (i.e. a church, synagogue, mosque), non-profit organization, or the like.

According to an embodiment, the system and method 600 is particularly useful in facilitating a cohesive transmittal of information between a potential donor 604, educational institution representative 606, and financial institution representative 609 by way of the Internet 602. According to an embodiment, the potential donor 604 and/or educational institution representative 606 may access, modify, and/or collaboratively edit a feature in the virtual environment for the purpose of illustrating a view of a building, statue, signage, or the like relating to the potential donor's likeness, namesake, organization, or the like. According to an embodiment, the educational institution representative 606 may take the potential donor 604 on a virtual tour of the virtual environment via the Internet 602 while modifying/editing a feature in the virtual environment for the purpose of illustrating a un/modified view of a building, statue, nameplate, or the like relating to the potential donor's likeness, namesake, organization, or the like. According to an embodiment, the potential donor 604 and/or educational institution representative 606 may interact with one or more financial institution representatives 609 to facilitate a financial transaction, such as, for example, a grant or donation, from the potential donor 604 to the educational institution 606.

The "educational institutional end" of this system 600 does not require the presence of a live person (represented by an educational institution representative 606). Although educational institution representative 606 can be a live person, it is also contemplated that the educational institution representative functions discussed herein could be implemented algorithmically in software to create a virtual educational institution representative 606, or the like. Therefore, according to an embodiment, the institutional end of the system 600 may include a live person/educational institution representative 606 that operates a terminal or a virtual educational institution representative 606 implemented in software. According to an embodiment, automated software may be located at a server 607 to perform the function of operating a virtual educational institution representative 606 or it may be implemented in a computer other than server 607. Communication to/from a educational institution representative 606 and server 607 may be enabled over a communication path 611-615.

In the case that the educational institution representative 606 is a live person operating a computer terminal, the educational institution representative 606 may include, for example, a university's chairman, one or more directors from a board, a business development representative, an alumni relations officer, or the like. The potential donors 604 may include, for example, an alumnus, a community leader, a business organization representative, a benefactor, or the like.

Figure 7:
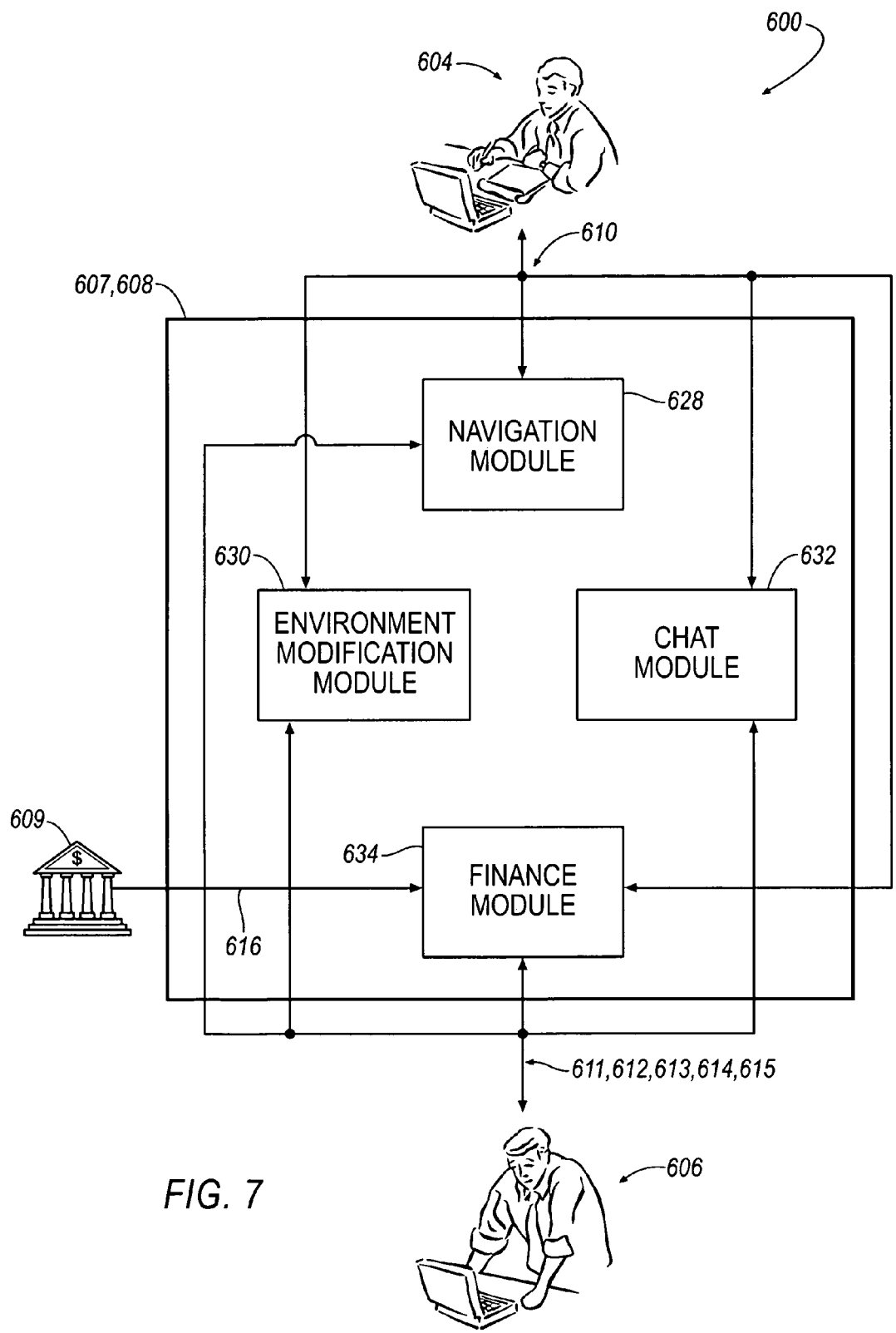
FIG. 7 is a block diagram of the system and method for using virtual environments according to an embodiment.

Referring to FIGS. 6 and 7, an operation module of the system and method 600 is shown generally at 608. The operation module 608 is hosted by, or, hosted on behalf of the educational institution representative 606. Although the operation module 608 is shown remotely with respect to the location of the educational institution representative 606 in FIG. 6, it will be appreciated that the operation module 608 may be located proximate, integral, and/or networked with the educational institution representative's computer workstation 606. In addition to the computer workstation in FIG. 6, the potential donor 604 and/or educational institution representative 606 may also utilize sensory stimulating technologies including, but not limited to, a virtual reality head-mounted display, force feedback actuators, sound devices, olfactory stimulating devices, or the like.

Additionally, the system and method 600 may include one or more telephones, IP telephones, microphones, or the like so that the potential donor 604 and/or educational institution representative 606 may communicate verbally over the Internet 602 using well-known voice over IP (VoIP) technologies. Accordingly, such equipment may used as a primary component to enable communications between a potential donor 604, institutional representatives 606, or the like. Alternatively such equipment may be used to supplement the keyboard to enable voice and text communications between one or more potential donors 604, institutional representatives 606, or the like.

Referring to FIG. 7, the system-level technologies may include, but are not limited to, a navigation module 628, an environment modification module 630, a chat module 632, and a finance module 634. As illustrated, the potential donor 604 has bi-directional communication with each of the navigation, environment modification, chat, and finance modules 628-634 over the communication channel 610. The educational institution representative 606, may similarly, have bi-directional communication with each of the navigation, environment modification, chat, and finance modules 628-634.

The navigation and environment modification modules 628, 630 may include a real-time graphics engine, a virtual reality engine, an immersive graphics medium, a physics engine, or the like. The environment modification module 630 may include application specific software that permits the potential donor 604 and/or educational institution representative 606 to alter, change, modify, or otherwise edit buildings, landscaping, signage, or the like in the virtual environment. 'Navigation' and 'Modification' in the interactive graphical environment, can be adapted to encompass the range of traditional input devices (i.e., a keyboard/mouse/joystick), as well as imminent implementations of gyroscopic motion-tracking devices, or, alternatively, advanced eyeball tracking devices or the like.

The chat module 632 may include an online networked utility. 'Chatting' will allow communication between potential donors 604, educational institution representatives 606, and financial institution representatives 606 within the interactive graphical environment. The chat module 632 may be implemented as a client/server system to engage many potential donors 604 simultaneously. The finance module 634 may include a database and report generation utility that can be standardized to feed one or more financial databases associated with, for example, the donor's financial institution 609 over a communication path 616 and the education institution's financial institution 609.

To invoke the chat module 632, for example, the potential donor 604 may navigate, in the virtual environment, to an educational institution representative 606, which may appear as a virtual person, and, upon arriving at the location of the virtual person, a chat window may appear for selection. Alternatively, the potential donor 604 may click on a graphical "chat button" appearing in the computer terminal monitor to request/initiate a chat with an educational institution representative 606 that is available and currently navigating the virtual environment.

As indicated, the navigation module 628 is employed to permit the potential donor 604 to explore interactive graphics provided by the organization/educational institution representative 606 that may be in the form of a three-dimensional, 360-degree virtual environment (i.e. virtual reality imaging). According to an embodiment, the virtual environment may replicate existing facilities on a university campus including dormitories, classroom buildings, student activity buildings, libraries, social halls, bookstores, stadiums, gymnasiums, offices relating to admissions/registrars/professors/academic advisor, deans, or the like.

The generation of the interactive graphics to the potential donor 604 can be achieved through the real-time graphics engine, virtual reality engine, or any desirable immersive graphical mechanism. As such, a networked exploration of a virtual space is provided where a potential donors 604 can interact by means of a seamlessly integrated interface provided by the operation module 608.

According to an embodiment, one or more potential donors 604 may elect to have a virtual tour guide, virtual admissions representative, or virtual alumni relations officer lead/participate in a virtual exploration in addition to answering any questions that the potential donor 604 may have. In addition to the exploratory interactions that a potential donor 604 may take advantage of by using the system and method 600, the environment modification module 630 and chat module 632 may automatically save the "modification and chat session" between the potential donor 604 and educational institution representative 606 so that exact changes to the virtual environment and likings of the potential donor 604 may be passed on for later use by a professional, such as, for example, an architect, landscape designer, sculptor, or the like, that may execute design plans in the real world that is being simulated in the virtual environment. Alternatively, if desired, the passing-on of the modification and chat session may be eliminated, and, a professional, such as, for example, an architect, landscape designer, sculptor, or the like, may participate in real time during the virtual tour, chat, or the like by way of a computer terminal workstation that interacts with the system and method 600 over the Internet 602 with the potential donor 602 and/or educational institution representative 606.

Figure 8:
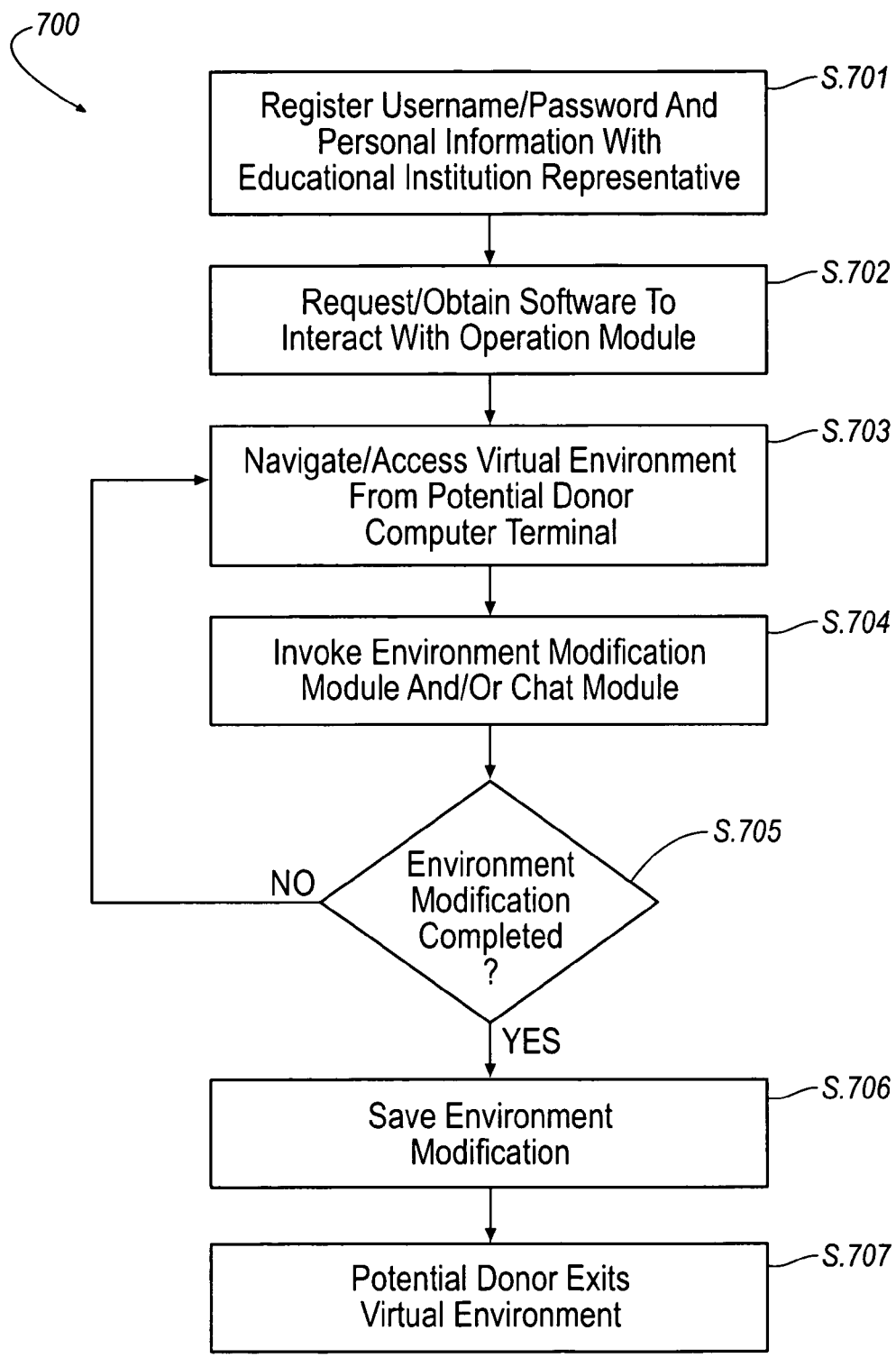
FIG. 8 is a flow chart for operating the system and method from the candidate computer terminal side according to an embodiment.

Referring now to FIG. 8, a flow chart 700 for operating the system and method 600 from the potential donor computer terminal side is shown according to an embodiment. First, at step S.701, the potential donor 604 registers a username/password and personal information with an educational institution representative 606 and/or internet server 607 on the institutional end of the system 600. The personal information may include the name, address, telephone, email address, a donor's financial institution name, a donor's financial institution account number, or the like. The registration may take place, for example, by way of an electronic communication over the Internet 602, or, by way of, a paper-based system via traditional mail service. Then, at step S.702, software that enables interaction with the operation module 608 is requested/obtained by way of, for example, an electronic download over the Internet 602. Alternatively, the software may be acquired on a CD-ROM from the organization/educational institution representative 606 and installed on the potential donor's computer terminal.

At step S.703, the potential donor 604 executes the software for interacting with the operation module 608 and navigates the virtual environment as described above. At step S.704, during the navigation of the virtual environment, the environment modification module 630 and/or the chat module 632 may be invoked as described above. Then, at step S.705, the operation module 608 will detect if and when the potential donor has indicated that a modification to the virtual environment is completed (e.g., by initiating a "save changes" feature, in, for example step S.706). At step S.707, the potential donor 604 may, at any time, manually exit the virtual environment, signaling the end of the program.

Figure 9A:
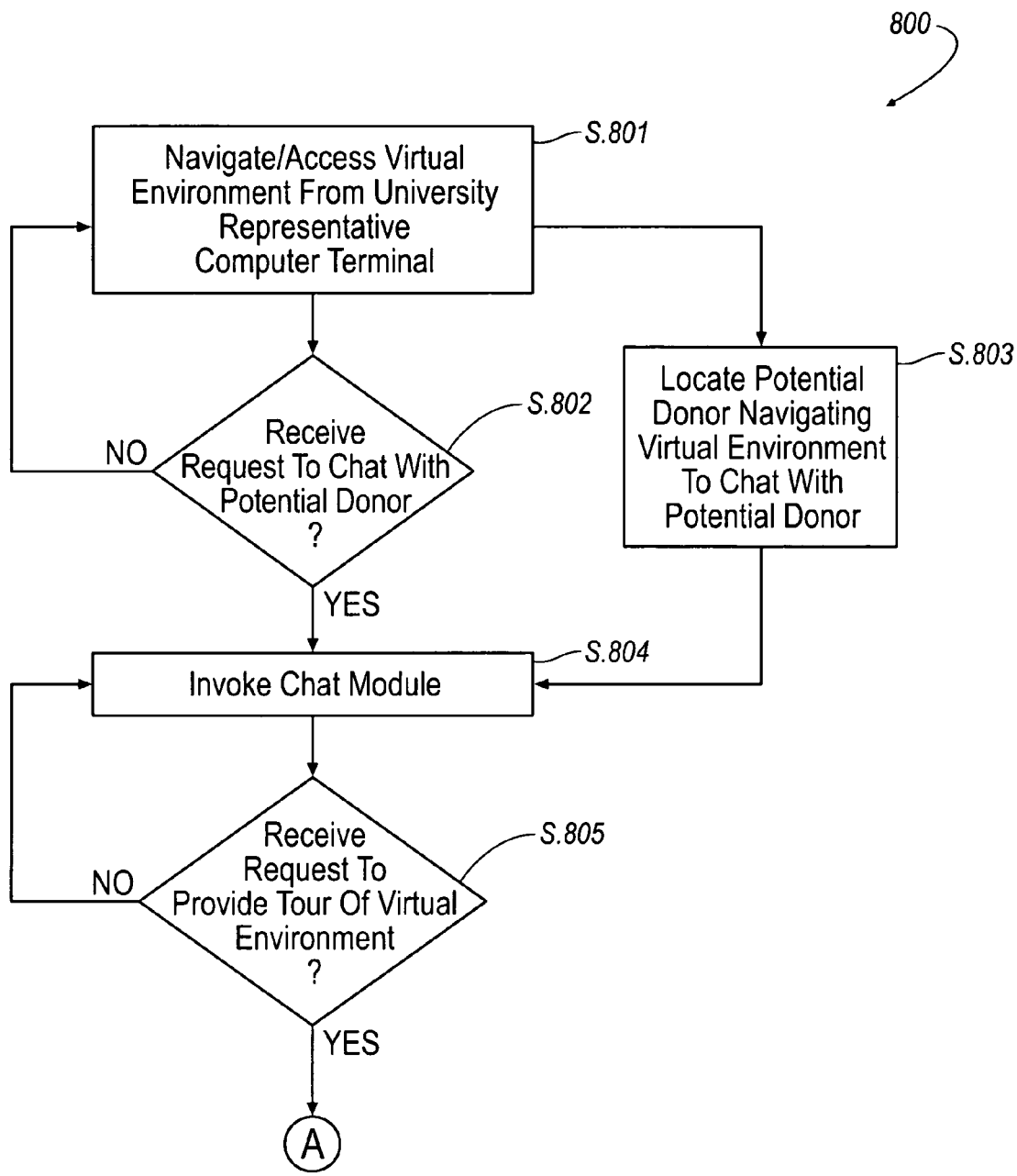
FIGS. 9A and 9B represent a flow chart for operating the system and method according to an embodiment.
Figure 9B:
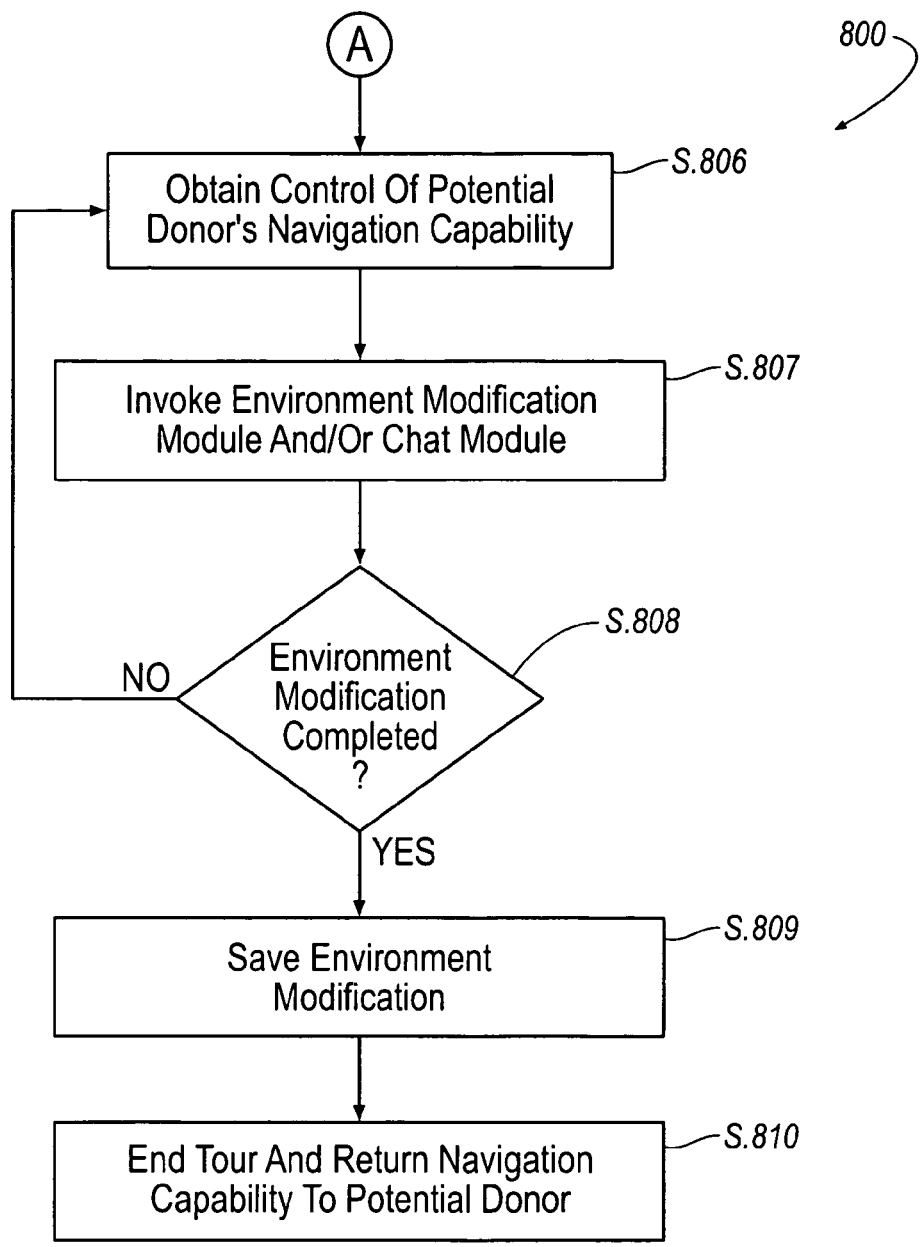

Referring now to FIGS. 9A and 9B, a flow chart 800 for operating the system and method 600 from the educational institution representative computer terminal side is shown according to an embodiment. First, at step S.801, a live representative 606 (i.e. a person) or a virtual representative 606 (i.e., an automated program) navigates/accesses the virtual environment, with, for example, an assigned username/password. Then, at step S.802, the educational institution representative 606 may receive a request to chat with a potential donor 604; alternatively, the educational institution representative 606 may locate a potential donor 604 in the virtual environment at step S.803 for unsolicited chatting. Upon engaging the potential donor 604 at either step S.802 or S.803, the chat module 632 is invoked at step S.804 from the educational institution representative computer terminal side as illustrated in FIG. 7.

At step S.805, the educational institution representative 606 may receive a request from the potential donor 604 for a tour of the virtual environment. If a tour is requested, the educational institution representative 606 may obtain control of the potential donor's navigation capabilities at step S.806. During the course of the tour, the educational institution representative 606 and/or the potential donor 604 may modify or otherwise collaboratively edit the virtual environment, thereby invoking the environment modification module at step S.808. Upon completing the tour and environment modifications, the changes to the virtual environment and chat log may be saved at step S.809. Then, at step S.810, the educational institution representative 606 and/or potential donor 604 may end the tour and exit the virtual environment.

As such, it will be appreciated that system and method 600 is useful in a number of applications for the benefit of utilizing interactive graphics for soliciting and securing financial gifts from potential donors to an educational institution. Potential donors 604 that may be remotely located from the educational institution, or, for example, challenged with computer literacy or lacking in proficient hand-eye coordination may benefit by seeing what a building, landscaping, signage, or the like may look like if a donation or grant is to be given to the educational institution. Additionally, the educational institution 606 may benefit may holding a virtual meeting and sale-pitch to the potential donor 604 in a way that maximizes efficiency in the donation/grant solicitation process.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A system for establishing a virtual environment that permits communication between a participant and one or more agents of an organization, comprising:
   at least one computer terminal that provides
      means for permitting the participant to interface with the virtual environment; and
   an operation module coupled to said at least one computer terminal that provides
      means for manipulating the virtual environment in response to one or more actions invoked by the participant by way of the at least one computer terminal, wherein the means for manipulating includes navigating the virtual environment to a target, wherein the target triggers a module that executes one or more functions to provide means for assessing the mental dexterity of the participant in response to virtual environment stimuli; and means for permitting the one or more agents of the organization to obtain control over virtual environment navigation capabilities possessed by the participant, wherein the obtaining of control of the virtual environment navigation capabilities provides means for permitting the participant to selectively surrender independent exploration capabilities of the virtual environment in favor of dependent exploration capability of the virtual environment provided by the one or more agents of the organization.

2. The system for establishing a virtual environment according to claim 1, wherein the participant is a candidate, wherein the assessing of the mental dexterity includes assessing the candidate's interests, analytical capability, or social interactions with others that are virtually represented in a three-dimensional, 360-degree virtual environment.

3. The system for establishing a virtual environment according to claim 2, wherein the operation module includes
a navigation module,
a puzzle/problem module,
a chat/networking module, and
an evaluator module.

4. The system for establishing a virtual environment according to claim 3, wherein the navigation module includes
a real-time graphics engine,
a virtual reality engine,
an immersive graphics medium, and
a physics engine.

5. The system for establishing a virtual environment according to claim 4, wherein the operation module further provides
means for permitting the candidate to navigate the virtual environment and send/receive virtual sensory feedback by way of the at least one computer terminal, wherein the at least one computer terminal includes a keyboard, mouse, joystick, one or more motion-tracking devices and one or more eyeball tracking devices.

6. The system for establishing a virtual environment according to claim 3, wherein the puzzle/problem module includes
application specific customized software, wherein the application specific customized software includes
case studies,
logic problems,
memory tests,
trivia questions, and
strategy games.

7. The system for establishing a virtual environment according to claim 3, wherein the chat/networking module includes
an online networked utility including
a client/server system that provides
means for permitting communication between local client hardware and a centralized server.

8. The system for establishing a virtual environment according to claim 3, wherein the evaluator module includes
a database and report generation utility that provides
means for feeding Customer Relationship Management tools and Data Mining Utilities to assist in deciphering or correlating navigation information, puzzle/problem information, and chat/networking information for evaluating the candidate.

9. The system for establishing a virtual environment according to claim 2, wherein the at least one computer terminal further provides
means for permitting the candidate to remotely interface with the operation module over the Internet.

10. A method for using a virtual environment for an admission application process of an academic institution, comprising the steps of:
providing, from a candidate to the academic institution, one or more admission application records selected from the group consisting of a resume, an academic record, an essay, and one or more standardized test scores;
utilizing a computer terminal for permitting the candidate to have access to the virtual environment and for permitting the candidate to conduct the step of navigating the virtual environment to a target, wherein the target triggers a puzzle/problem module and/or a chat/networking module having one or more functions that are executed, whereupon responses made by the candidate to the one or more functions of the puzzle/Problem module and/or chat/networking module is transmitted to an evaluator module;
utilizing the evaluator module for preparing a virtual environment rating that is based upon interests, analytical capabilities, and social interactions of the candidate that were virtually conveyed from the candidate within the virtual environment during the transmitting step;
utilizing the evaluator module for assigning the candidate with a virtual environment rating based upon one or more of the interests, the analytical capabilities, and the social interactions of the candidate that were virtually conveyed from the candidate within the virtual environment during the transmitting step; and
supplementing the one or more admission application records with the assigned virtual environment rating as part of an admission criteria for the academic institution.

11. The method for using virtual environments according to claim 10 further comprising the step of
permitting the candidate to navigate the virtual environment.

12. The method for using virtual environments according to claim 11 further comprising the step of
receiving a request from the candidate for a tour of the virtual environment by the one or more agents of the academic institution.

13. The method for using virtual environments according to claim 12 further comprising the step of
obtaining control, by the one or more agents of the academic institution, navigation capabilities possessed by the candidate.

14. The method for using virtual environments according to claim 10 further comprising the step of
receiving a request from the candidate to chat with one or more agents of the academic institution or one or more other candidates that is/are simultaneously competing for admission to the academic institution.

15. The method for using virtual environments according to claim 10 further comprising the steps of:
tallying a puzzle/problem score, and
preparing a chat/networking log report, and/or
analyzing and scoring the chat/networking log report.

16. The method for using virtual environments according to claim 15 wherein the virtual environment rating further includes the tallied puzzle/problem score and chat/networking report.

17. The method for using virtual environments according to claim 11 further comprising the step of
monitoring navigational responses of the candidate during the navigation of the virtual environment that are instigated by visual triggers incorporated into a graphical user interface.

18. A method for using virtual environments, comprising:
utilizing at least one computer terminal for transmitting information within a virtual environment from a candidate to an organization;
utilizing an evaluator module for
compiling a virtual environment rating criteria of the candidate that is based upon the transmitted information, wherein the virtual environment rating criteria is utilized for
evaluating interests, analytical capabilities and social interactions of the candidate that was conveyed by the candidate within the virtual environment; and
supplementing the virtual environment rating criteria with one or more non-virtual environment criteria selected from the group consisting of a resume an academic record, an essay and one or more standardized test scores that were provided to the organization outside of the scope of the virtual environment for
providing the organization with virtually-enhanced admission criteria for an application for admission into the organization.

19. A system for utilizing a virtual environment for conducting a charitable financial transaction, comprising:
at least one first computer terminal that provides
means for interfacing a financial gift solicitor to the virtual environment;
at least one second computer terminal that provides
means for interfacing a potential donor to the virtual environment; and
an operation module coupled to the at least one first and second computer terminals, wherein the operation module provides
means for permitting one or more of the first and second computer terminals to manipulate a visual representation of the virtual environment in response to one or more actions by one or more of the financial gift solicitor and the potential donor, wherein the operation module and the at least one first and second computer terminals are coupled to the Internet for collectively providing
means for soliciting a gift from the potential donor to be given to an organization associated with the virtual environment in response to a manipulation of the visual representation of the virtual environment.

20. The system for establishing a virtual environment according to claim 19, wherein the at least one first computer terminal provides
means for interfacing a financial institution representative to the virtual environment.

21. The system for establishing a virtual environment according to claim 19, wherein the at least one first computer terminal provides
means for interfacing an architect, landscape designer or sculptor to the virtual environment.

22. The system for establishing a virtual environment according to claim 19, wherein the operation module includes
a navigation module,
an environment modification module,
a chat module, and
a financial module.

23. The system for establishing a virtual environment according to claim 22, wherein the navigation module and environment modification module include
a real-time graphics engine,
a virtual reality engine,
an immersive graphics medium, and
a physics engine.

24. The system for establishing a virtual environment according to claim 22, wherein the chat module includes
an online networked utility having a client/server system that provides
means for permitting communication between local client hardware and a centralized server.

25. The system for establishing a virtual environment according to claim 22, wherein the finance module provides
means for establishing communications and permitting financial transactions between the one or the one or more participants and the organization.

26. The system for establishing a virtual environment according to claim 19, wherein the at least one computer terminal provides
means for permitting one or more of the financial gift solicitor and the potential donor to remotely interface with the operation module over the Internet.

27. A method for utilizing a virtual environment for conducting a charitable financial transaction, comprising the steps of:
utilizing at least one first computer terminal for interfacing a financial gift solicitor to the virtual environment;
utilizing at least one second computer terminal for interfacing a potential donor to the virtual environment; and
utilizing an operation module coupled to the at least one first and second computer terminals for
transmitting information to/from the financial gift solicitor and the potential donor within the virtual environment, and
soliciting a financial gift from the potential donor to be given to an organization associated with the virtual environment.

28. The method for using virtual environments according to claim 27 further comprising the step of
navigating the virtual environment, and
modifying the virtual environment in response to one or more actions by one or more of the financial gift solicitor and the potential donor.

29. The method for using virtual environments according to claim 28 further comprising the step of
receiving a request from the potential donor for a tour of the virtual environment by the financial gift solicitor.

30. The method for using virtual environments according to claim 29 further comprising the step of
permitting the financial gift solicitor to obtain control of navigation capabilities possessed by the potential donor.

31. The method for using virtual environments according to claim 27 further comprising the step of
receiving a request from the potential donor to chat with one or more of an agent of the organization and the financial gift solicitor.

* * * * *